(12) United States Patent
Hawkins et al.

(10) Patent No.: US 7,472,877 B2
(45) Date of Patent: Jan. 6, 2009

(54) SELF-ALIGNING TRUNNIONS FOR ROTARY DRYER/MIXER

(76) Inventors: Michael R Hawkins, 10735 NE. 112th St., Kansas City, MO (US) 64157; William L Walkington, 7910 E. 233rd Rd., Peculiar, MO (US) 64078; Lonnie D. Greene, 744 N. Oakland Ave., Kansas City, MO (US) 64158

( * ) Notice: Subject to any disclaimer, the term of this patent is extended or adjusted under 35 U.S.C. 154(b) by 254 days.

(21) Appl. No.: 11/049,100

(22) Filed: Feb. 2, 2005

(65) Prior Publication Data

US 2006/0169857 A1    Aug. 3, 2006

(51) Int. Cl.
*A47F 5/00*    (2006.01)
(52) U.S. Cl. .................... 248/288.31; 248/49
(58) Field of Classification Search ............... 248/608, 248/580, 659, 200, 274.1, 288.11, 288.31, 248/346.06, 349.1, 49, 53; 384/127, 418, 384/548, 554, 561, 565
See application file for complete search history.

(56) References Cited

U.S. PATENT DOCUMENTS

| | | | | | |
|---|---|---|---|---|---|
| 2,269,700 | A | * | 1/1942 | Treshow | 248/130 |
| 2,399,189 | A | * | 4/1946 | Johnson | 384/549 |
| 3,466,936 | A | * | 9/1969 | Gaupin | 74/88 |
| 4,160,569 | A | * | 7/1979 | Reid | 384/549 |
| 5,897,289 | A | * | 4/1999 | Pardi et al. | 414/789.1 |

* cited by examiner

*Primary Examiner*—A. Joseph Wujciak, III
(74) *Attorney, Agent, or Firm*—Joseph B Bowman

(57) ABSTRACT

A multi-point support system with self-aligning trunnions to carry, on a cradle frame, a rotatable cylindrical drum having a pair of trunnion rings spaced along a central longitudinal axis. A thrust bearing connected to the frame engages a trunnion ring to accommodate any horizontal thrust load for an inclined cylindrical drum. Each self-aligning trunnion includes a base plate on which is mounted a trunnion roller with an axis of rotation substantially parallel to the central longitudinal axis of the cylindrical drum. A pair of bearing supports are connected to the base plate transversely with respect to the longitudinal axis of the drum in order to permit arcuate movement of the base plate about one bearing support and to permit tilting movement of the base plate about a transverse axis through the bearing supports. The arcuate and tilting movements of the base plate permit the trunnion roller to maintain full tangential contact with the trunnion ring.

4 Claims, 8 Drawing Sheets

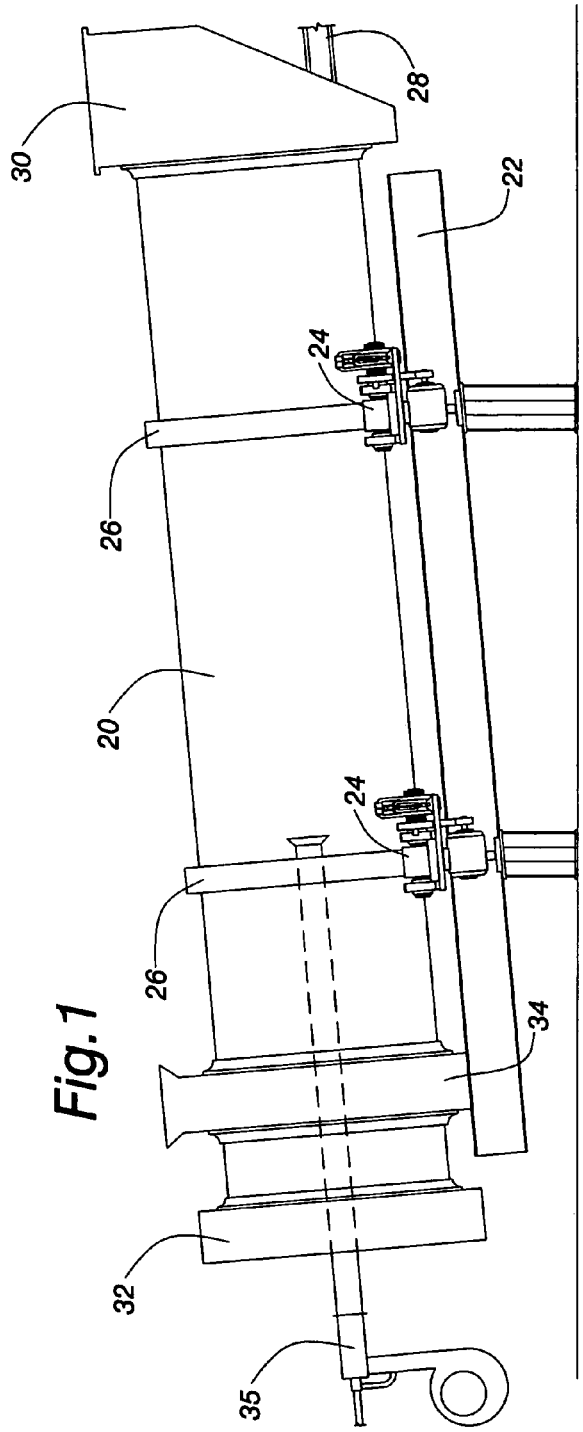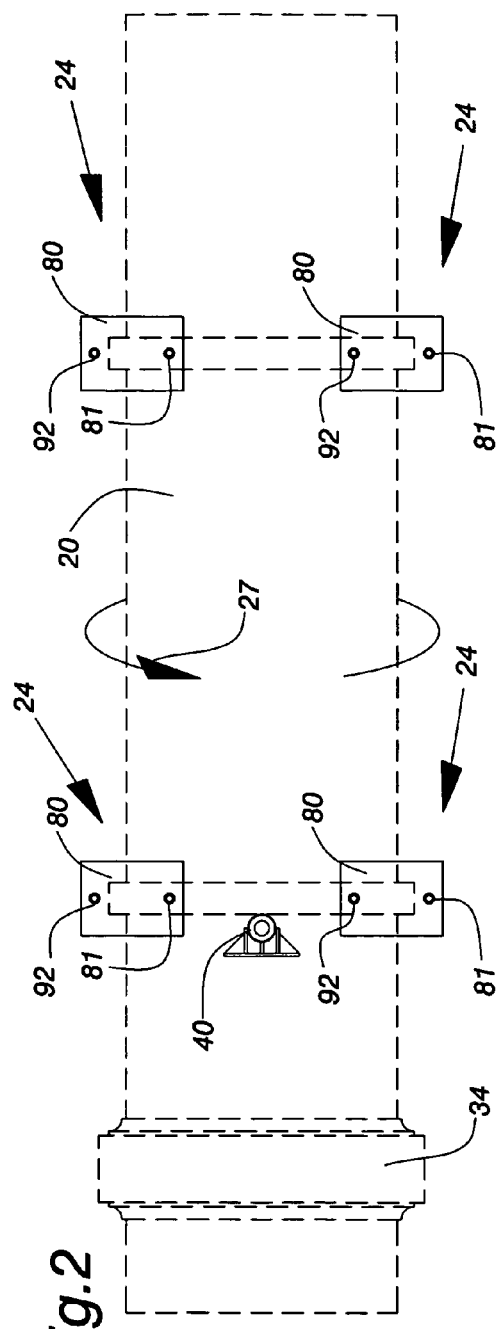

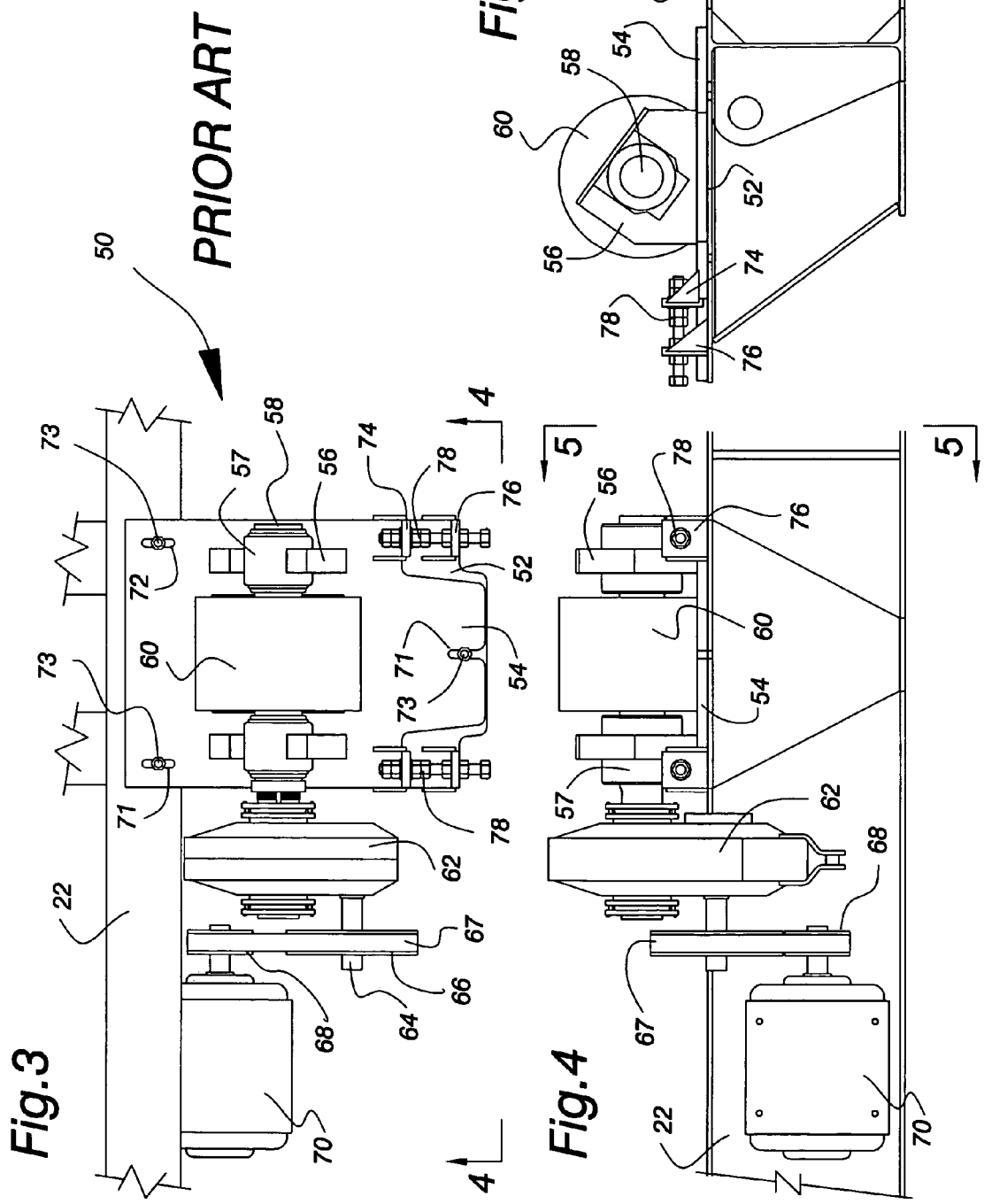

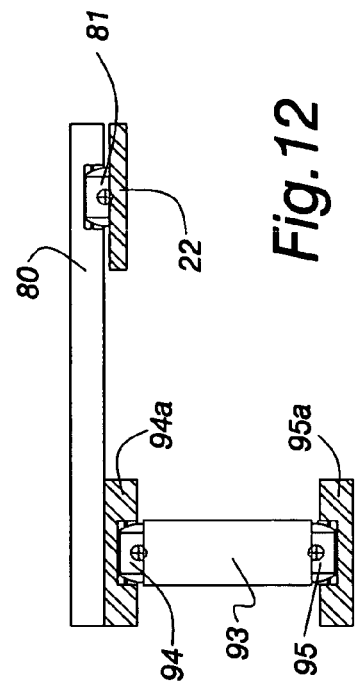
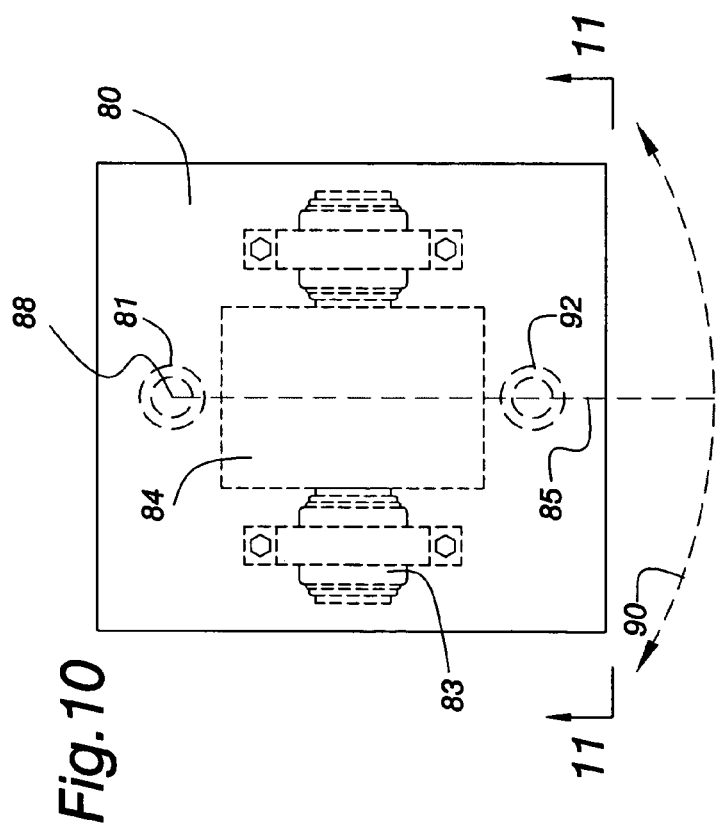
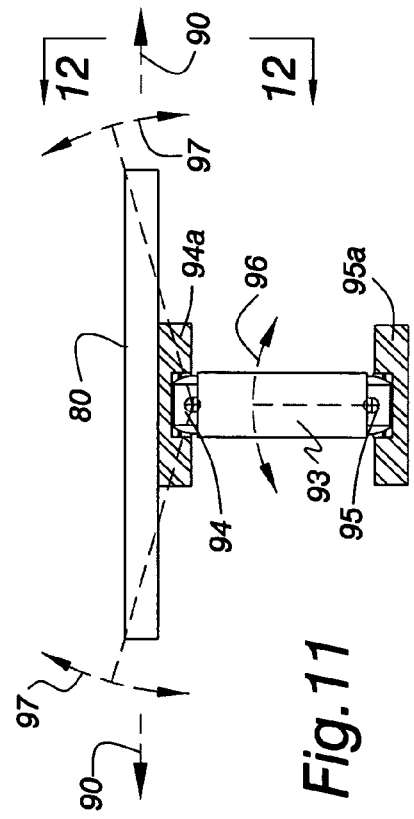

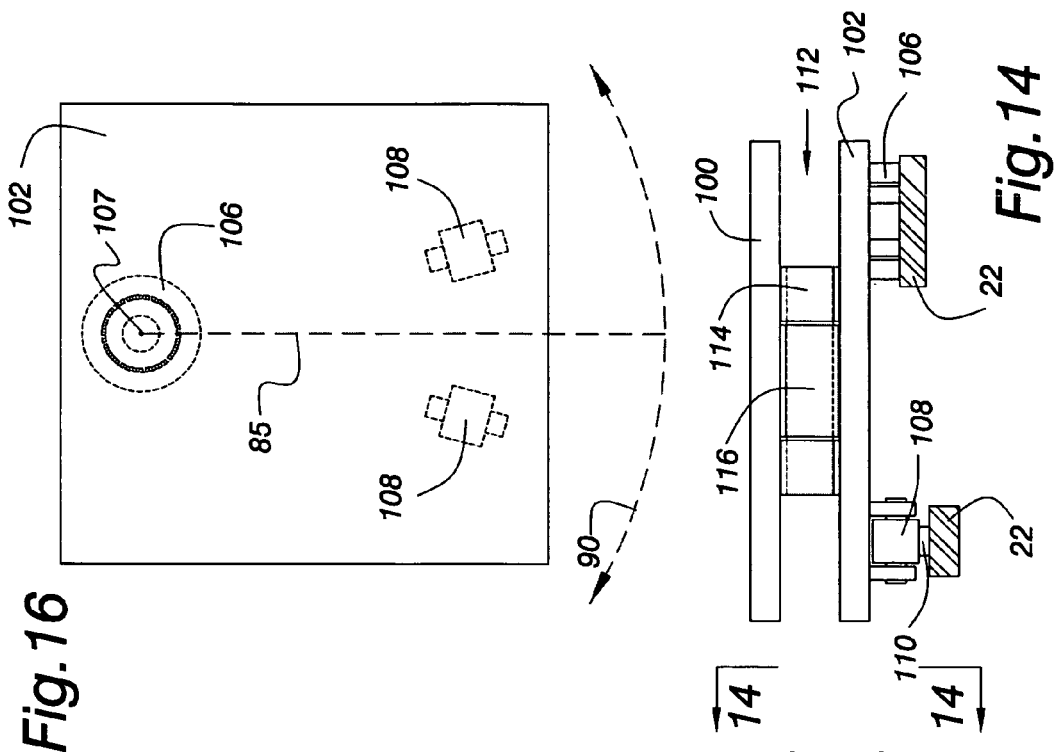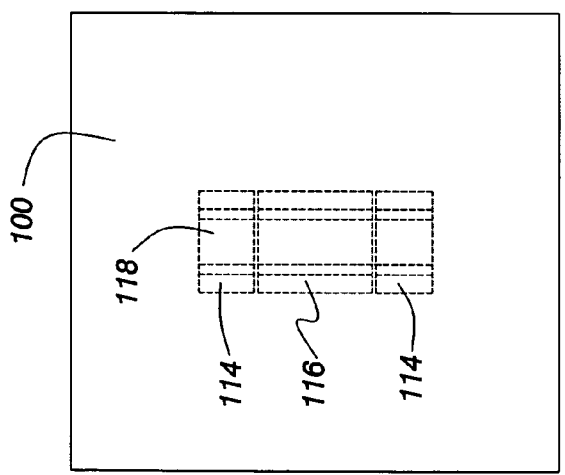

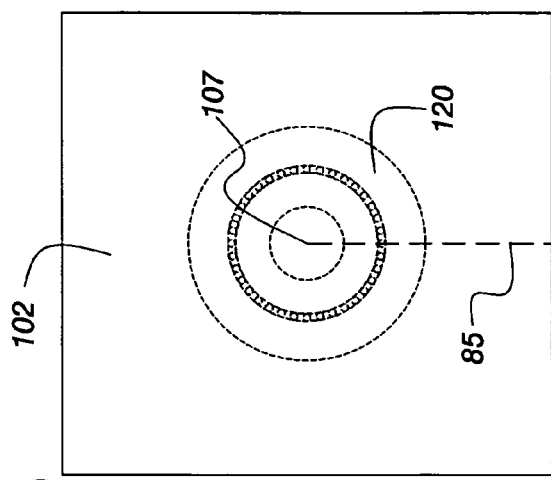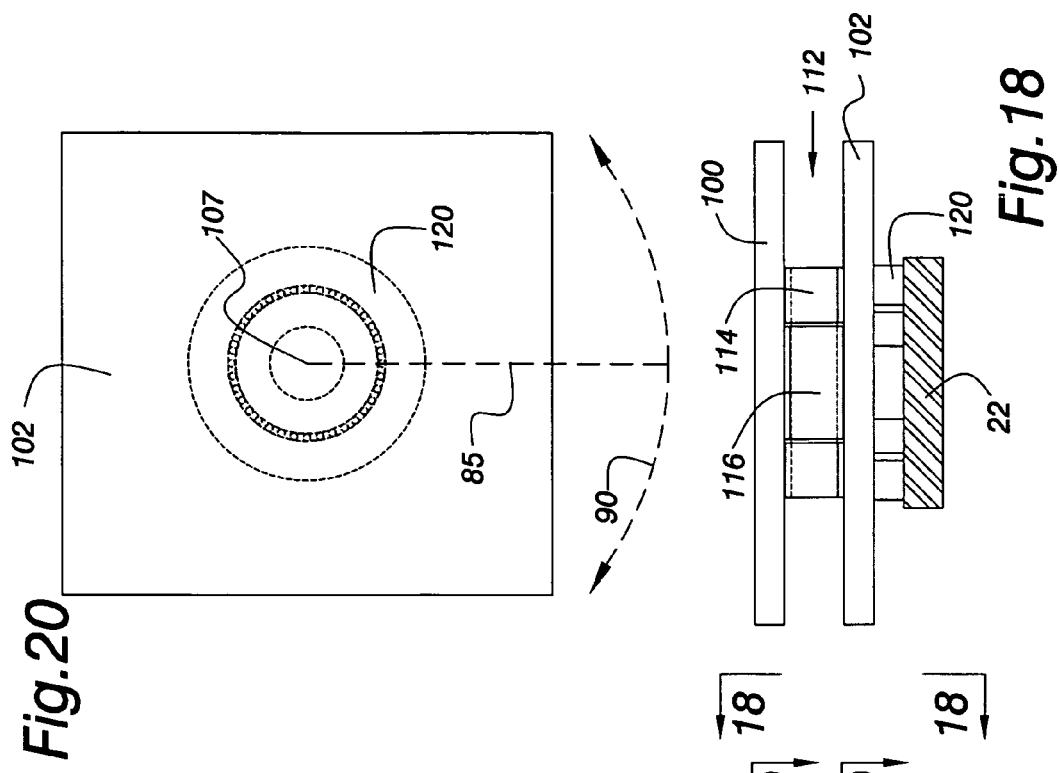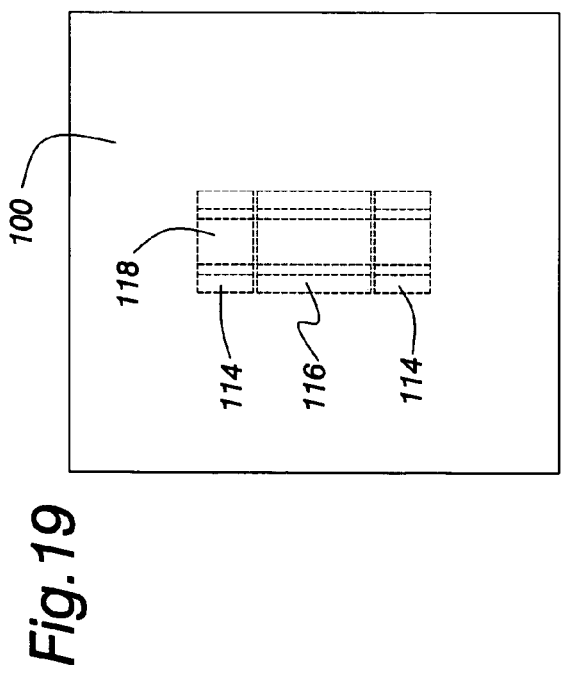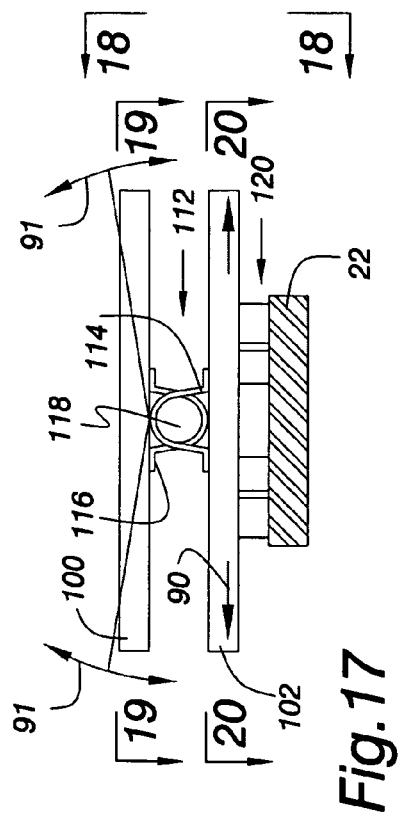

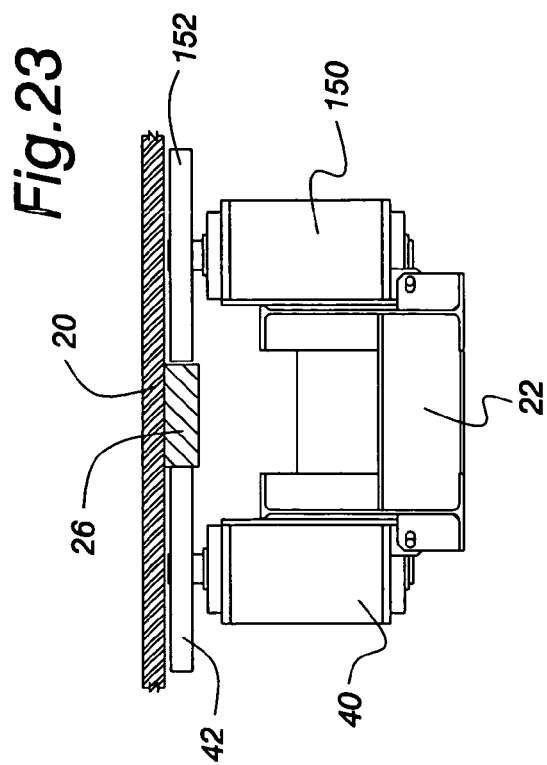
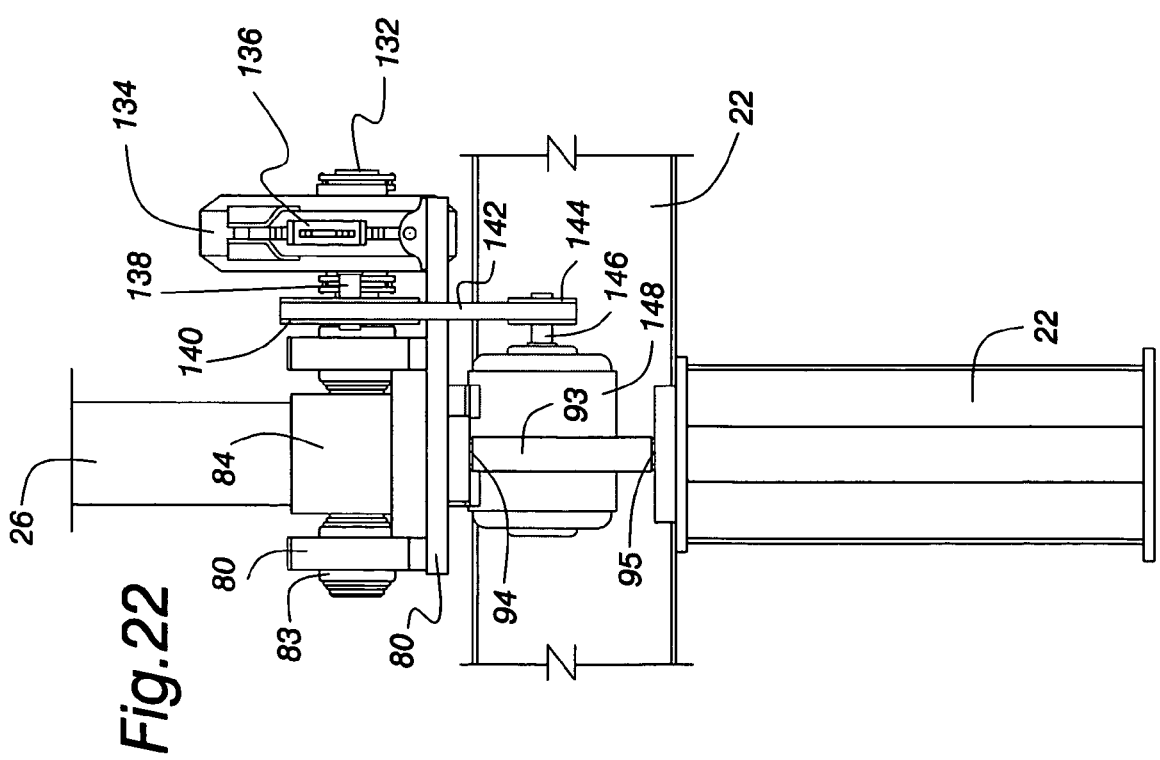

SELF-ALIGNING TRUNNIONS FOR ROTARY DRYER/MIXER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to the support trunnions of rotary dryers and drum mixers. More specifically, this invention relates to self-aligning trunnions to provide full contact between trunnion support rollers and the trunnion rings encircling a rotatable cylindrical dryer or drum mixer such as used in soil reclamation, quarry and asphalt plant operations.

Drying and mixing equipment for these types of plant operations generally comprises a large diameter steel cylinder drum circumscribed by two steel tires, known as trunnion rings, with one being mounted toward each end of the cylinder. The cylinder is supported in a substantially horizontal position by four steel carrying rollers or trunnions. Power to rotate the cylinder upon the trunnions is provided either by motors driving the trunnion rollers or by a separate system which drives the cylinder directly through a ring and pinion gear or a sprocket and chain.

Alignment of the trunnions is critical. Ideally the axis of rotation of each trunnion roller should be parallel to the axis of rotation of the rotary drum and its associated trunnion rings. When parallel, the mating surfaces of the trunnion rollers and rings are in full contact promoting uniform wear and maximizing power transmission. However, since most rotary drums and dryers are slightly inclined (typically 3 to 6 degrees from horizontal) to facilitate transporting the process material within the drum from one end to the other, there is a need to control the resulting horizontal downhill thrust load on the equipment. The industry has, heretofore, accomplished this by slightly skewing the trunnion rollers, relative to the trunnion rings, to create a compensating uphill thrust. Barrier or thrust rollers are commonly added in close proximity to the uphill and downhill side of one or more of the trunnion rings as a fail-safe to keep the dryer from walking longitudinally off the trunnion rollers in either the uphill or downhill direction. Alternatively, flanges may be incorporated at each end of the trunnion rollers to capture the trunnion ring therebetween and to prevent the drum from walking off the trunnion rollers when there is horizontal movement.

The industry is plagued with problems associated with the practice of skewing the trunnions. Accurate alignment is extremely difficult for several reasons. First, precise measurements of a few thousandths of an inch on a drum or dryer that may be from 6 to 12 feet in diameter and from 30 to 60 feet in length, and even larger in the case of cement kilns, is difficult in itself even under the best of circumstances given the manufacturing tolerances to which such large scale equipment can be built. Second, the degree to which the trunnions must be skewed actually changes depending on whether the drum is loaded or unloaded, and even on the amount of load. Generally, the greater the load the greater the response to any skewing of the trunnions. With too much skew the drum will ride hard uphill. With insufficient skew the drum will ride hard downhill. Third, the actual shape of the drum and trunnion rings can change with thermal expansion at different temperatures causing variation in the response to skewing of the trunnions. Alignment, and more specifically correct alignment, is a constant operational problem because it is ever changing.

Another problem associated with the practice of skewing the trunnions is that the power requirement to rotate the drum increases as the trunnions are skewed from a parallel alignment with the drum. When the trunnions are skewed, full bearing with the trunnion ring is reduced with a resulting loss in power transmission when the drum is trunnion driven. Additionally, trunnions are often individually skewed in ways that work in opposition to each other. That is, one trunnion may be forcing the drum uphill while another is influencing it downhill. This condition is common because quick adjustments to resolve a problem of the drum walking too hard, either uphill or downhill, often involves adjusting just one trunnion. Theoretically, and for best operation, all four trunnions should remain parallel with one another and, therefore, each should be adjusted identically. In actual practice, however, it is much easier for the maintenance personnel to adjust just one trunnion enough to accomplish the desired result of stabilizing the longitudinal travel of the drum. As these adjustments occur periodically and on various maintenance shifts over time, it often develops that the trunnions may be working against each other, and thereby creating a load which must be overcome with additional horsepower.

An additional problem is the often-excessive wear on the trunnion rings and the trunnions themselves induced by the skewing of the trunnions. When the trunnions are at odds with one another, as described above, significant wear will occur. Generally, this results in skipping or slipping of one or more of the trunnions relative to the face of the trunnion rings. This, in turn, results in a washboard wear pattern on the face of the trunnion ring, which after a period of time, can make the drum inoperable because of wear induced vibration.

A need remains in the industry for an improved multi-point support system for rotating drums and dryers to address the problems and drawbacks heretofore experienced with skewed trunnion rollers. The primary objective of this invention is to meet this need.

SUMMARY OF THE INVENTION

More specifically, an object of the invention is to provide a multi-point support system with continuously self-aligning trunnions to carry a rotatable cylindrical drum having spaced apart trunnion rings.

Another object of the invention is to provide a multi-point support system with self-aligning trunnions in combination with a thrust bearing to accommodate the downhill thrust load of an inclined, rotatable drum.

Another object of the invention is to provide self-aligning trunnions of the character described which are automatically maintained in full contact with the associated trunnion rings without need for periodical maintenance or adjustment.

A corollary object of the invention is to provide self-aligning trunnions of the character described being automatically maintained in full contact with the associated trunnion rings without need for periodical maintenance or adjustment regardless of whether the trunnion rollers are powered to rotate the drum or the drum has a drive system independent of the trunnion rollers.

An additional object of the invention is to provide self-aligning trunnions of the character described having a simple and economical mechanical design without the need for adjustable controls or sensors.

A further object of the invention is to provide self-aligning trunnions of the character described which are of a rugged construction adapted to accommodate a wide range of manufacturing tolerances and specification conformities for large, industrial sized dryers and mixers.

Yet another object of the invention is to provide self-aligning trunnions of the character described which minimizes wear on the associated trunnion rollers and rings.

Other and further objects of the invention, together with the features of novelty appurtenant thereto, will appear in the detailed description of the drawings.

In summary, a multi-point support system with self-aligning trunnions to carry, on a cradle frame, a rotatable cylindrical drum having a pair of trunnion rings spaced along a central longitudinal axis. A thrust bearing connected to the frame engages a trunnion ring to accommodate any horizontal thrust load for an inclined cylindrical drum. Each self-aligning trunnion includes a base plate on which is mounted a trunnion roller with an axis of rotation substantially parallel to the central longitudinal axis of the cylindrical drum. A pair of bearing supports are connected to the base plate transversely with respect to the longitudinal axis of the drum in order to permit arcuate movement of the base plate about one bearing support and to permit tilting movement of the base plate about a transverse axis through the bearing supports. The arcuate and tilting movements of the base plate permit the trunnion roller to maintain full tangential contact with the trunnion ring.

BRIEF DESCRIPTION OF THE DRAWINGS

In the following description of the drawings, in which like reference numerals are employed to indicate like parts in the various views:

FIG. 1 is a side view of a counter-flow asphalt drum mixer equipped with self-aligning trunnions constructed in accordance with a preferred embodiment of the invention;

FIG. 2 is a schematic top plan view illustrating the drum in relation to multiple support trunnions and a downhill thrust bearing;

FIG. 3 is a top plan view of a prior art trunnion which may be adjustably skewed with respect to the support frame on which it is mounted;

FIG. 4 is a side elevational view of the prior art trunnion taken along line 4-4 of FIG. 3 in the direction of the arrows;

FIG. 5 is an end elevational view of the prior art trunnion taken along line 5-5 of FIG. 4 in the direction of the arrows;

FIG. 10 is a top plan, schematic view of a trunnion base plate and the associated bearings to permit arcuate and tilting movements of the trunnion roller in accordance with a second preferred embodiment of the invention with the trunnion roller shown in broken lines;

FIG. 11 is side elevational, schematic view taken along line 11-11 of FIG. 10 in the direction of the arrows;

FIG. 12 is an end elevational, schematic view taken along line 12-12 of FIG. 11 in the direction of the arrows;

FIG. 13 is a side elevational, schematic view of a trunnion base having double plates and the associated bearings to permit arcuate and tilting movements of the trunnion roller in accordance with a third preferred embodiment of the invention;

FIG. 14 is an end elevational, schematic view taken along line 14-14 of FIG. 13 in the direction of the arrows;

FIG. 15 is a top plan view of the upper plate with its underlying bearing shown in broken lines as taken along line 15-15 of FIG. 13 in the direction of the arrows;

FIG. 16 is a top plan view of the lower plate with its underlying bearing shown in broken lines as taken along line 16-16 of FIG. 13 in the direction of the arrows;

FIG. 17 is a side elevational, schematic view of a trunnion base having double plates and the associated bearings to permit arcuate and tilting movements of the trunnion roller in accordance with a fourth preferred embodiment of the invention;

FIG. 18 is an end elevational, schematic view taken along line 18-18 of FIG. 17 in the direction of the arrows;

FIG. 19 is a top plan view of the upper plate with its underlying bearing shown in broken lines as taken along line 19-19 of FIG. 17 in the direction of the arrows;

FIG. 20 is a top plan view of the lower plate with its underlying bearing shown in broken lines as taken along line 20-20 of FIG. 17 in the direction of the arrows;

FIG. 22 is a side elevational view of a trunnion taken along line 22-22 of FIG. 21 in the direction of the arrows; and FIG. 23 is a side elevational view of a downhill and an optional, uphill thrust bearing taken along line 23-23 of FIG. 21 in the direction of the arrows.

DETAILED DESCRIPTION OF THE DRAWINGS

Figure 9:
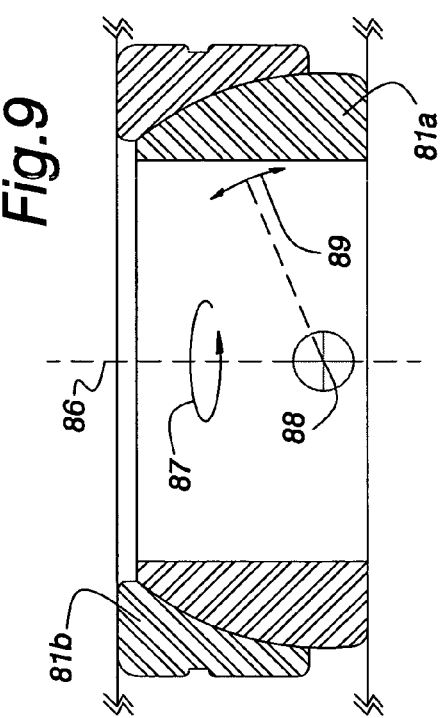
FIG. 9 is an enlarged sectional view of a ball and socket bearing used as a support bearing in the right hand side of FIG. 8.

Referring now to the drawings in greater detail, attention is first directed to FIG. 1 for an explanation of a conventional counter-flow asphalt plant shown supported on a cradle frame by a multi-point support system which is the subject of this invention. It will be understood by those skilled in the art that the invention is equally adaptable to rotary kilns, mixers, aggregate dryers and soil reclamation equipment.

The asphalt plant of FIG. 1 includes a substantially horizontal, single cylindrical drum mixer 20 carried on a ground engaging support frame 22 at a slight angle of declination, typically in the range of 3 to 6 degrees. Mounted on the frame 22 are two pairs of large, motor driven trunnions 24 which supportingly receive trunnion rings 26 secured to the exterior surface of the drum mixer 20. Thus, rotation of the trunnions 24 engaging the trunnion rings 26 causes the drum mixer 20 to be rotated about its central longitudinal axis as indicated by arrow 27 in FIG. 2.

Located at the inlet or upstream end of the drum mixer 20 is an aggregate feeder 28 to deliver aggregate to the interior of the drum mixer 20 from a storage hopper or stockpile (not shown). The inlet end of the drum mixer 20 is closed by a flanged, gas exhaust port 30 leading to conventional air pollution control equipment (not shown), such as a baghouse, to remove particulates from the gas stream.

Located at the outlet end of the drum mixer 20 is a discharge housing 32 to direct asphaltic composition from the drum mixer 20 to a material conveyor (not shown) for delivery of the final product to a storage bin or transporting vehicle.

A combustion assembly 35 adjacent the discharge housing 32 generates a hot gas stream which flows through the drum mixer 20 from the discharge housing 32 to the gas exhaust port 30.

Within the drum mixer 20 are fixed various types of flights or paddles for the alternative purposes of lifting, tumbling, mixing, and moving aggregate within the drum mixer 20 to facilitate the drying and heating of the aggregate therein. Intermediate the ends of the drum mixer 20, it is well known to include a recycle feed assembly 34 by which recycle asphalt material may be introduced into the drum 20. Further details pertaining to asphalt plant construction and operation may be found in Hawkins U.S. Pat. No. 4,787,938 incorporated herein by reference.

The cradle frame 22 includes a pair of spaced apart longitudinal beams which are interconnected with cross beams and are supported on ground engaging legs. A pair of trunnions 24 receive the drum 20 at each trunnion ring 26 so that the load of the drum 20 is primarily carried by at least four such trunnions 24.

In order to compare and contrast the prior art skewed trunnions with the continuously self-aligning trunnions 24 of the present invention, reference is made to a typical skewed trunnion 50 as shown in FIGS. 3-5. The trunnion 50 includes a mounting plate 52 secured to the ground engaging support frame 22. Overlying the mounting plate 52 is a base plate 54 to which is securely fixed bearing blocks 56 for receiving bearings 57 for the axle 58 of the trunnion roller 60. The trunnion roller axle 58 is connected to the output collar of a gear reducer 62. The input shaft 64 of the gear reducer 62 includes a pulley wheel 66 driven by belt 67 from motor pulley 68 of drive motor 70 mounted on the support frame 22.

The base plate 54 has an elongate mounting slot 71 and elongate holes 72 which receive bolts 73 for locking the base plate 54 onto the underlying mounting plate 52. On each side of the base plate 54 are upstanding ears 74 which register with similar ears 76 from the mounting plate 52. Skewing bolts 78 interconnect the upstanding ears 74 of the base plate 54 with the similar ears 76 of the mounting plate 52. With bolts 73 loosened, the skewing bolts 78 may be adjustably varied to change the angular position of base plate 54 on its underlying mounting plate 52. Such adjustment fixes the engagement of trunnion roller 60 with the associated trunnion ring 26 of the drum 20 as desired to influence the force of the trunnion roller 60 in one direction or the other on the trunnion ring 26.

A key aspect of this invention is the separation of the control of the horizontal thrust load of the drum 20 from the alignment of the trunnions 24 as shown in FIG. 2. Therefore, a thrust bearing roller 40 of sufficient capacity to continuously absorb the horizontal thrust load of the drum 20 is mounted on the frame 22 on the downhill side of at least one trunnion ring 26. The thrust bearing 40 includes a roller 42 which engages the side of the trunnion ring 26 in order to resist the horizontal force vector of the drum load caused by the angle of declination of the drum 20. The vertical force vector of the drum load is, of course, distributed among the four trunnions 24. With a thrust bearing 40 of sufficient capacity in place, there is no horizontal movement of the drum 20 and, therefore, it is no longer necessary to skew the trunnions 24.

Figure 6:
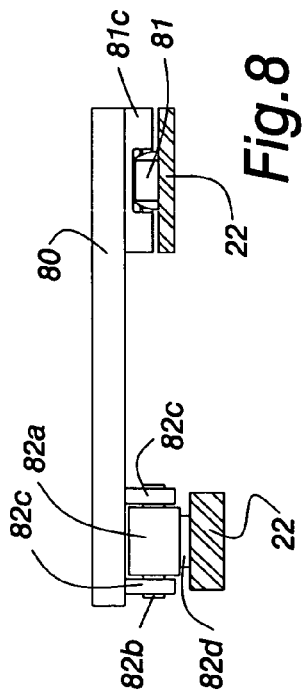
FIG. 6 is a top plan, schematic view of a trunnion base plate and the associated bearings to permit arcuate and tilting movements of the trunnion roller in accordance with a first preferred embodiment of the invention with the trunnion roller shown in broken lines.
Figure 7:
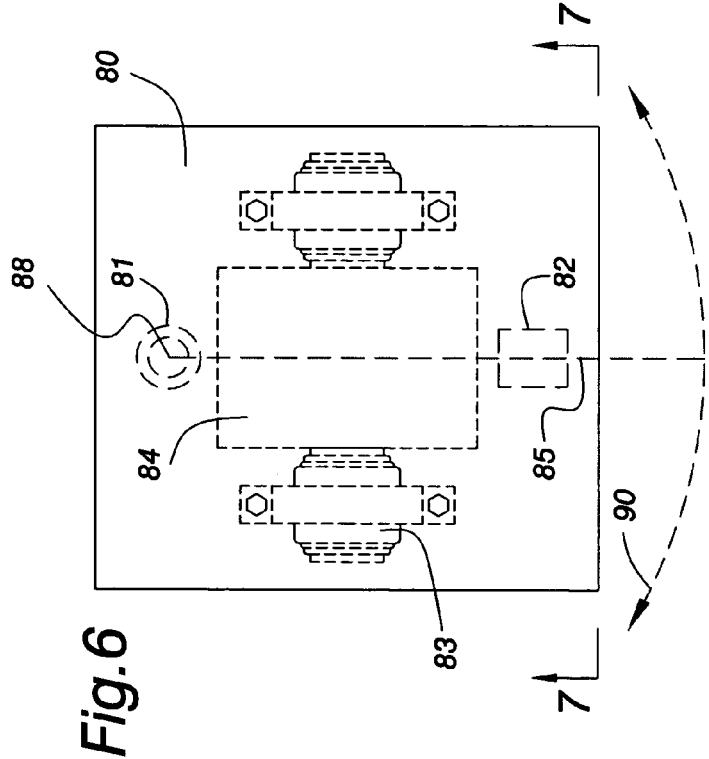
FIG. 7 is side elevational, schematic view taken along line 7-7 of FIG. 6 in the direction of the arrows.
Figure 8:
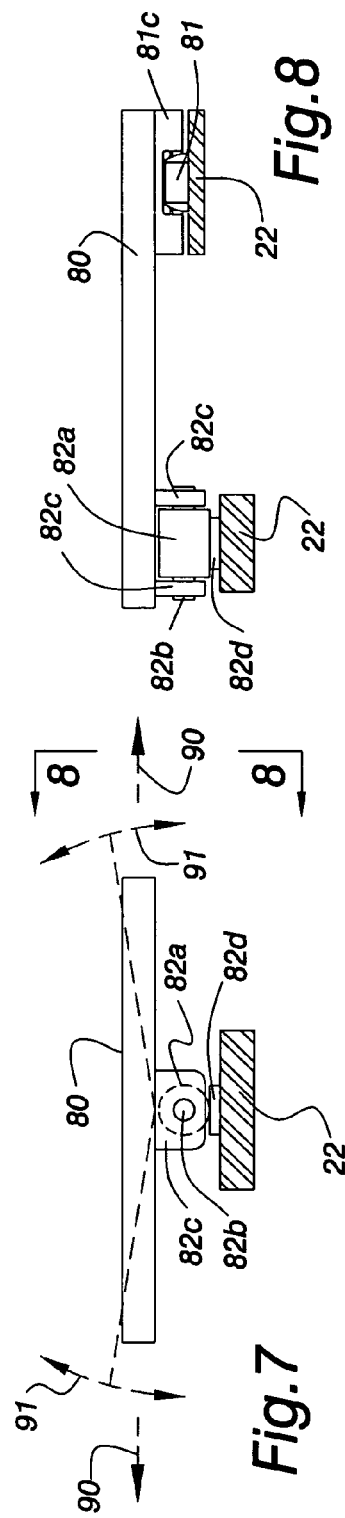
FIG. 8 is an end elevational, schematic view taken along line 8-8 of FIG. 7 in the direction of the arrows.

In order to better understand the principles underlying this invention, reference is made to FIGS. 6-8 showing a first preferred embodiment in a somewhat schematic illustration. These views show just the trunnion base plate 80 and its two underlying support bearings 81 and 82 so that the movements of the base plate 80 critical to the invention can be appreciated. A trunnion roller 84 and its associated bearings 83 are illustrated in broken lines in FIG. 6 to show that the axis of rotation of the trunnion roller 84 is substantially parallel to the central axis of rotation of the cylindrical drum 20 and substantially transverse to a transverse axis (i.e., broken line 85) extending generally perpendicular from the central axis of rotation of the cylindrical drum 20.

The first support bearing 81 connected to the underside of the trunnion base plate 80 is a truncated ball and socket bearing having a male ball component 81a received by a female socket component 81b as sectionally illustrated in FIG. 9. This type of bearing is alternatively known in the industry as a spherical plain angular contact bearing. The relative movements achieved with such a bearing include the rotational movement between the ball component 81a and the socket component 81b about the central axis 86 of the ball component 81b as indicated by arrow 87 in FIG. 9. An additional relative movement achieved with such a bearing includes a limited canting of the ball component 81a with respect to the socket component 81b about the spherical center 88 as indicated by the arrows 89.

As shown in FIG. 8, the ball component 81a may be secured to the underlying frame 22 while the socket component 81b may be secured to the underside of the base plate 80 in a bearing block 81c. Alternatively, the bearing 81 may be reversed. That is to say, the ball component 81a may be secured to the underside of the base plate 80 while the socket component 81b in its bearing block 81c may be secured to the support frame 22.

The second support bearing 82 connected to the underside of the trunnion base plate 80 is a roller 82a carried on a pin 82b extending between bearing ears 82c fixed to the base plate 80. The roller 82a engages a bearing plate 82d connected to the support frame 22.

Thus, the first and second bearings 81 and 82 are oriented along a transverse axis 85 from the central longitudinal axis of the drum 20. The bearings 81 and 82 in combination, therefore, permit a slight arcuate movement of the entire base plate 80 on a radius arm from the spherical center 88 of the first bearing 81 as indicated by the arrows 90 in FIGS. 6 & 7. Specifically, this arcuate movement is accomplished by arcuate rotation of the socket component 81b relative to the ball component 81a and by rolling of the roller 82a on the bearing plate 82d. Additionally, the bearings 81 and 82 in combination, permit a slight tilting movement of the entire base plate 80 along a transverse axis from the central longitudinal axis of the drum 20 as indicated by the arrows 91 in FIG. 7. Specifically, this tilting movement is accomplished by canting of the ball component 81a with respect to the socket component 81b about the spherical center 88 and tilting of the base plate 80 on the pin 82b which extends through the roller 82a.

The aforementioned arcuate and tilting motions of the base plate 80 as achieved by the first and second bearings 81 and 82 permit the trunnion roller 84 to continuously maintain full contact with the associated trunnion ring 26 as it rotates. Thus, the trunnion roller 84 is caused to accurately track the trunnion ring 26 even though manufacturing tolerances may result in a condition where not all portions across the face of the trunnion ring 26 are uniformly equidistant from the longitudinal central axis of the drum 20. Additionally, the aforementioned tilting movement of the base plate 80 as achieved by the first and second bearings 81 and 82 accommodates any variance in the angle of declination at each of the four support trunnions 24 which receive the drum 20. In other words, if the angle of declination of the cradle frame 22 is specified to be 5 degrees, for example, manufacturing tolerances may result in the actual angle of declination at each of the four trunnions 24 to be slightly over or under the desired angle. Tilting of the base plate 80 at each of the 4 support points effectively eliminates such variance.

The foregoing arcuate and tilting movements of the base plate 80 may be achieved in a variety of ways without departing from the scope of the invention. Reference is made to FIGS. 10-12 showing a second preferred embodiment in a somewhat schematic manner similar to FIGS. 6-8. FIGS. 10-12 show just the trunnion base plate 80 and its two underlying support bearings 81 and 92 so that the movements of the base plate 80 critical to the invention can be appreciated. A trunnion roller 84 and its associated bearings 83 are illustrated in broken lines in FIG. 10 to show that the axis of rotation of the trunnion roller 84 is substantially parallel to the central axis of rotation of the cylindrical drum 20 and substantially transverse to a transverse axis (i.e., broken line 85) extending generally perpendicular from the central axis of rotation of the cylindrical drum 20.

The first support bearing 81 connected to the underside of the trunnion base plate 80 is a truncated ball and socket bearing having a male ball component 81a received by a female socket component 81b as previously described with reference to FIG. 9.

As shown in FIG. 12, the ball component 81a may be secured to the underlying frame 22 while the socket component 81b may be secured to the underside of the base plate 80 in a bearing block 81c. Alternatively, the bearing 81 may be reversed. That is to say, the ball component 81a may be secured to the underside of the base plate 80 while the socket component 81b in its bearing block 81c may be secured to the support frame 22.

The second support bearing 92 connected to the underside of the trunnion base plate 80 includes a cylindrical strut 93 having a ball and socket bearing 94 and 95 on each end thereof. Each such ball and socket bearing 94 and 95 has a ball component and a socket component as previously described with reference to FIG. 9. This type of bearing is alternatively known in the industry as a spherical plain angular contact bearing. As illustrated, the ball components of the bearings 94 and 95 are affixed to opposite ends of the strut 93. Bearing blocks 94a and 95a respectively receive the socket components of bearings 94 and 95 with bearing block 94a being attached to the underside of the base plate 80 and the bearing block 95a being attached to the cradle frame 22. However, either one or both of the bearings 94 and 95 may have their respective ball and socket components reversed without detriment.

Thus constructed, the first and second bearings 81 and 92 are oriented along a transverse axis 85 from the central longitudinal axis of the drum 20. The bearings 81 and 92 in combination, therefore, permit a slight arcuate movement of the entire base plate 80 on a radius arm from the spherical center 88 of the first bearing 81 as indicated by the arrows 90 in FIGS. 10 & 11. Specifically, this arcuate movement is accomplished by arcuate rotation of the socket component 81b relative to the ball component 81a and by angular deflection of the strut 93 about the spherical center of the lowermost ball and socket bearing 95 as indicated by the arrows 96 in FIG. 11. Additionally, the bearings 81 and 92 in combination, permit a slight tilting movement of the entire base plate 80 along a transverse axis from the central longitudinal axis of the drum 20 as indicated by the arrows 97 in FIG. 11. Specifically, this tilting movement is accomplished by canting of the ball component 81a with respect to the socket component 81b about the spherical center 88 and by the canting of the ball component of bearing 94 with respect to its socket component on the upper end of strut 93.

The aforementioned arcuate and tilting motions of the base plate 80 as achieved by the first and second bearings 81 and 92 permit the trunnion roller 84 to continuously maintain full contact with the associated trunnion ring 26 as it rotates. Additionally, the aforementioned tilting movement of the base plate 80 as achieved by the first and second bearings 81 and 92 accommodates any variance in the angle of declination at each of the four support trunnions 24 which receive the drum 20.

Reference is now made to FIGS. 13-16 showing a third preferred embodiment in a somewhat schematic manner similar to the embodiments of FIGS. 6-8 and FIGS. 10-12. Instead of one base plate 80, however, the base comprising a pair of plates. The upper plate 100 achieves the tilting motion of the trunnion roller as previously described and the lower plate 102 achieves the arcuate motion. It will be understood that a trunnion roller and its associated bearings, while not shown in FIG. 15 for the purpose of clarity of the underlying bearing, are present on the upper plate 100 and, if shown, would appear as in FIG. 6 or 10 such that the axis of rotation of the trunnion roller is substantially parallel to the central axis of rotation of the cylindrical drum 20 and substantially transverse to a transverse axis extending generally perpendicular from the central axis of rotation of the cylindrical drum 20.

A first support bearing, designated generally by the numeral 104, connected to the underside of the lower plate 102 includes a turntable bearing 106 interconnecting the upper region of the lower plate 102 to an underlying portion of the support frame 22. Connected to the underside of the lower plate 102 in the lower region thereof are a pair of spaced apart rollers 108 with their respective axes of rotation along a radius from the center pivot point 107 of the turntable bearing 106. The rollers 108 engage a bearing track 110 attached to an underlying portion of the support frame 22.

So constructed, the first support bearing 104 is oriented generally along a transverse axis 85 for the central longitudinal axis of the drum 20 to permit a slight arcuate movement of the entire lower plate 102 about a radius arm from the pivot center 107 of the turntable bearing 106 as indicated by the arrows 90 in FIGS. 13 and 16. Specifically, this arcuate movement is accomplished by arcuate rotation of the turntable bearing 106 relative to the frame 22 with the rollers 108 being supported on their associated track 110 secured to the frame 22.

A second support bearing, designated generally by the numeral 112, interconnects the underside of the upper plate 100 to the upperside of the lower plate 102. As illustrated the second support bearing 112 includes a pair of space apart hinge brackets 114 attached to the upperface of the lower plate 102. Hinge bracket 116 is attached to the underside of the upper plate 100. With the hinge bracket 116 positioned between the spaced apart brackets 114, and pin 118 is inserted to form a hinge with its pivot axle substantially transverse to the longitudinal axis of rotation of the drum 20.

So constructed, the second bearing 112 is oriented along a transverse axis from the central longitudinal axis of the drum 20 to permit a slight tilting movement along said transverse axis of the upper plate 100 and the associated trunnion roller mounted thereon as indicated by the arrows 91 in FIG. 13. In other words, upper plate 100 may be tilted with respect to the lower plate 102 as a result of being interconnected by the second bearing 112.

The aforementioned arcuate and tilting motions of the trunnion base as achieved by the first and second bearings 104 & 112 permit the trunnion roller 84 to continuously maintain full contact with the associated trunnion ring 26 as it rotates.

Additionally, the aforementioned tilting movement of the trunnion base as achieved by the second bearing 112 accommodates any variance in the angle of declination at each of the four support trunnions which receive the drum 20.

It will be readily understood by those skilled in the art that the bearings 104 and 112 may be reversed. That is to say, bearing 104 may be disposed between upper plate 100 and lower plate 102 while bearing 112 may be interconnecting the lower plate 102 with the underlying support frame 22.

Reference is next made to FIGS. 17-20 showing a fourth preferred embodiment in a manner similar to the embodiment of FIGS. 17-20. Again the trunnion base includes a pair of plates referenced as the upper plate 100 and the lower plate 102 as before. Similarly, the upper plate 100 achieves the tilting motion of the trunnion roller as previously described and the lower plate 102 achieves the arcuate motion. It will be understood that a trunnion roller and its associated bearings, while not shown in FIG. 19 for the purpose of clarity of the underlying bearing, are present on the upper plate 100 and, if shown, would appear as in FIG. 6 or 10 such that the axis of rotation of the trunnion roller is substantially parallel to the central axis of rotation of the cylindrical drum 20 and substantially transverse to a transverse axis extending generally perpendicular from the central axis of rotation of the cylindrical drum 20.

The first support bearing is a large turntable bearing 120 symmetrically interconnecting the upper region of the lower plate 102 to an underlying portion of the support frame 22.

So constructed, the first support bearing 120 is oriented to permit a slight arcuate movement of the entire lower plate 102 about the pivot center 107 of the turntable bearing 120 as indicated by the arrows 90 in FIGS. 17 and 20. Specifically, this arcuate movement is accomplished by arcuate rotation of the turntable bearing 120 relative to the frame 22.

The second support bearing 112 is the same construction and movement as described in the previous embodiment. So constructed, the aforementioned arcuate and tilting motions of the trunnion base as achieved by the first and second bearings 120 & 112 permit the trunnion roller 84 to continuously maintain full contact with the associated trunnion ring 26 as it rotates. Additionally, the aforementioned tilting movement of the trunnion base as achieved by the second bearing 112 accommodates any variance in the angle of declination at each of the four support trunnions which receive the drum 20.

As in the case of the prior embodiment, the bearings 112 and 120 may be reversed. That is to say, bearing 120 may be disposed between upper plate 100 and lower plate 102 while bearing 112 may be interconnecting the lower plate 102 with the underlying support frame 22.

It will be understood by those skilled in the art that the foregoing multi-point trunnion support system may be advantageously utilized for a cylindrical drum mixer or dryer which has its own rotary power system. For example, such a power system is known to comprise a large sprocket which encircles and is attached to the drum shell. Rotation of the drum is accomplished with a drive chain trained around the sprocket and coupled to the output shaft of a motor. For such a system, the self-aligning trunnions as previously described may be used to support the drum at a predetermined angle of declination while maintaining full contact between the trunnion rollers and the trunnion rings of the drum.

Figure 21:
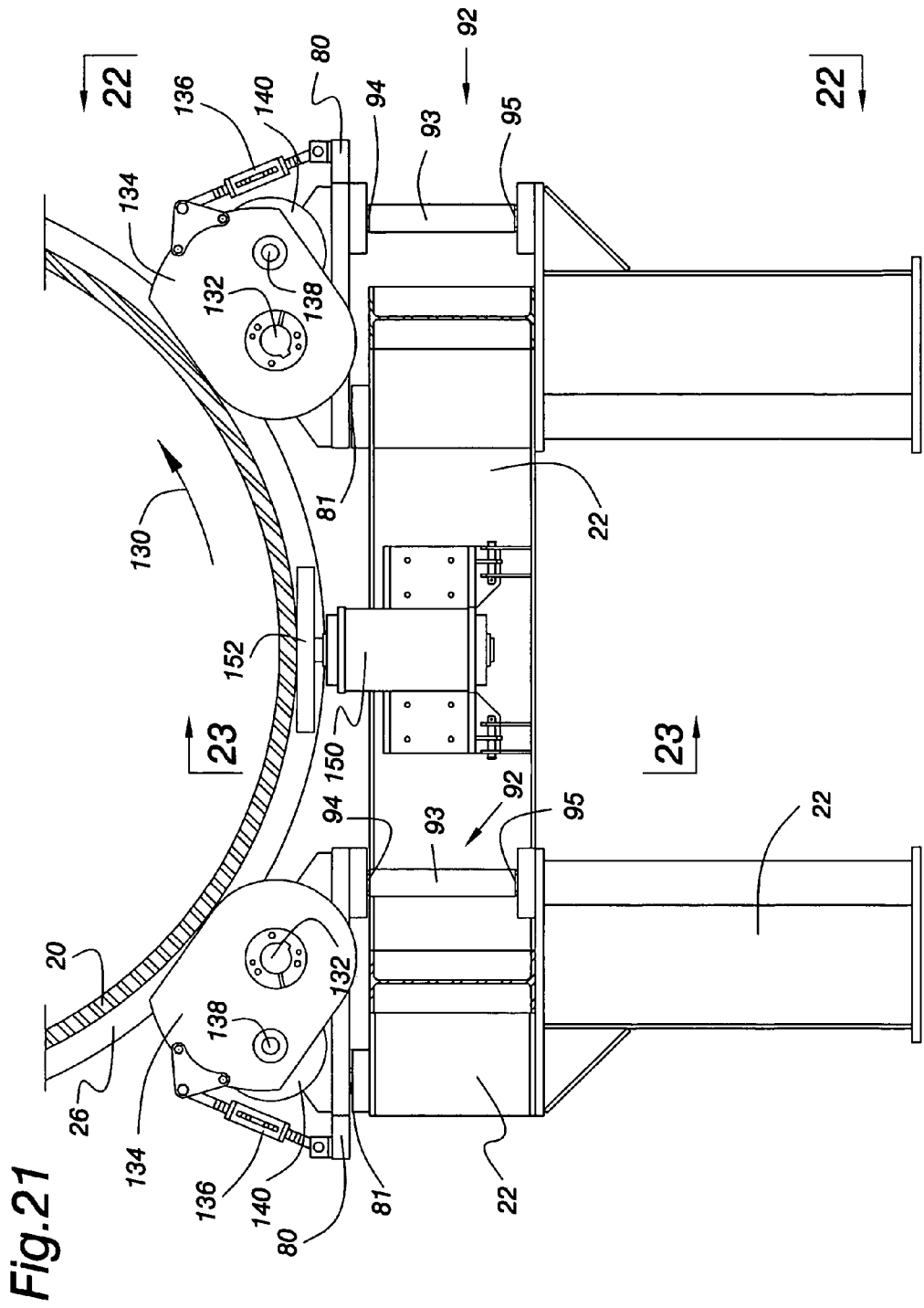
FIG. 21 is an end elevational view of a pair of trunnions constructed in accordance with the principles of the invention schematically illustrated in FIGS. 10-12.

It is also common in the industry, however, to rotate the drum 20 by rotatably powering the trunnion rollers 24 themselves. Adaptation of the invention to powered trunnion rollers 24 is specifically illustrated with reference to FIGS. 21 & 22. FIG. 21 shows a pair of trunnions 24 constructed in accordance with the foregoing principles of construction discussed with reference to FIGS. 10-12. Each base plate 80 is supported from its underside by first and second support bearings 81 and 92 as previously described. And the bearings 81 and 92 function in the manner previously described to achieve limited arcuate and tilting movements of the base plate 80. It is important to note that for each trunnion 24, the bearings 81 and 92 are oriented with respect to the base plate 80 in the same transverse direction as the rotation of drum 20 as indicated by the arrow 130.

Mounted on the base plate 80 are a pair of trunnion bearings 83 which carry the axle of the trunnion roller 84. The axle of the trunnion roller 84 is coupled to the output collar 132 of gear reducer 134 which is also mounted on the base plate 80 and includes a torque arm 136. The input shaft 138 of the gear reducer 134 is fitted with a pulley wheel 140 which receives a drive belt 142 trained around the output pulley wheel 144 of the output shaft 146 of drive motor 148. The motor 148 (not shown in FIG. 21 for clarity) may be conveniently mounted to the base plate 80.

So constructed, the motor 148 operates to rotate its output shaft 146 at relatively high RPMs which, in turn, rotates the input shaft 138 of the gear reducer 134. Reducer 134 functions to translate relative high RPMs to lower, but higher powered RPMs at its output collar 132 that drives the trunnion roller 84. By virtue of the arcuate and tilting movements of the base plate 80, the trunnion roller 84 is maintained in full contact with the associated trunnion ring 26 of the drum 20 in order to drive the drum 20 in the direction of the arrow 130 as shown in FIG. 21.

Lastly, with reference to FIG. 23, a downhill thrust bearing 40 connected to the cradle frame 22 includes a thrust bearing roller 42 to engage the side wall of the trunnion ring 26 and to carry the horizontal component of the force vector represented by the cylindrical drum 20 and any materials load present therein during operation of the plant. Optionally shown in FIG. 23 is an uphill thrust bearing 150 also connected to the cradle frame 22 and including a thrust bearing roller 152 to engage the trunnion ring 26 in the unlikely event any extraordinary condition was encountered that may cause the drum 20 to walk uphill.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, We claim:

1. Self-aligning trunnions connected to a cradle frame, and wherein said cradle frame supports a rotatable cylindrical drum having a pair of trunnion rings spaced along a central longitudinal axis thereof, said self-aligning trunnions comprising:

first and second pairs of base plates, said first pair positioned substantially proximate one of said trunnion rings and said second pair positioned substantially proximate the other of said trunnion rings, the two base plates of each said pair of base plates being spaced apart a distance less than the diameter of said cylindrical drum;

a single roller member with a longitudinal axis of rotation substantially parallel with said central longitudinal axis of said drum mounted on each of said four base plates with bearings to permit said roller members to engagingly support said trunnion rings at four positions to support said cylindrical drum; and first and second support bearings connected to each said base plate to contact said cradle frame, said first and second support bearings being in alignment on said base plate substantially transverse to the longitudinal axis of rotation of said roller member mounted on said base plate, said first and second support bearings adapted to permit slight arcuate movement of said base plate about said first support bearing and to permit slight tilting movement of said base plate about a common transverse axis through said first and second support bearings;

said first support bearing comprising mated ball and socket components wherein the ball component is rotatably received within the socket component to permit slight arcuate movement of said base plate about said first support bearing and to permit slight tilting movement of said base plate about a common transverse axis through said first and second support bearings;

whereby said arcuate and tilting movements of said base plates permit the roller members mounted thereon to maintain full contact with said trunnion rings.

2. Self-aligning trunnions connected to a cradle frame, and wherein said cradle frame supports a rotatable cylindrical drum having a pair of trunnion rings spaced along a central longitudinal axis thereof, said self-aligning trunnions comprising:

first and second pairs of base plates, said first pair positioned substantially proximate one of said trunnion rings and said second pair positioned substantially proximate the other of said trunnion rings, the two base plates of each said pair of base plates being spaced apart a distance less than the diameter of said cylindrical drum;

a single roller member with a longitudinal axis of rotation substantially parallel with said central longitudinal axis of said drum mounted on each of said four base plates with bearings to permit said roller members to engagingly support said trunnion rings at four positions to support said cylindrical drum; and first and second support bearings connected to each said base plate to contact said cradle frame, said first and second support bearings being in alignment on said base plate substantially transverse to the longitudinal axis of rotation of said roller member mounted on said base plate, said first and second support bearings adapted to permit slight arcuate movement of said base plate about said first support bearing and to permit slight tilting movement of said base plate about a common transverse axis through said first and second support bearings;

said second support bearing comprising a strut and first and second mated ball and socket components connected to each end of said strut wherein each ball component is rotatably received within the corresponding socket component to permit slight arcuate movement of said base plate about said first support bearing and to permit slight tilting movement of said base plate about a common transverse axis through said first and second support bearings;

whereby said arcuate and tilting movements of said base plates permit the roller members mounted thereon to maintain full contact with said trunnion rings.

3. A multi-point support system mounted on a cradle frame to rotate a cylindrical drum having a pair of trunnion rings spaced along a central longitudinal axis thereof, each point support comprising:

a base plate positioned substantially proximate of said trunnion ring, said base plate being spaced outwardly from a vertical plane through said central longitudinal axis a distance less than the radius of said cylindrical drum;

a roller member with a longitudinal axis of rotation substantially parallel with said central longitudinal axis of said drum mounted on said base plate with bearings to permit said roller member engages said trunnion ring; and first and second support bearings connected to said base plate to contact said cradle frame, said first and second support bearings being in alignment on said base plate substantially transverse to the longitudinal axis of rotation of said roller member mounted on said base plate, said first and second support bearings adapted to permit slight arcuate movement of said base plate about said first support bearing and to permit slight tilting movement of said base plate about a common transverse axis through said first and second support bearings;

said first support bearing comprising mated ball and socket components wherein the ball component is rotatably received within the socket component to permit slight arcuate movement of said base plate about said first support bearing and to permit slight tilting movement of said base plate about a common transverse axis through said first and second support bearings;

whereby said arcuate and tilting movements of said base plate permit the roller member mounted thereon to maintain full contact with said trunnion ring.

4. A multi-point support system mounted on a cradle frame to rotate a cylindrical drum having a pair of trunnion rings spaced along a central longitudinal axis thereof, each point support comprising:

a base plate positioned substantially proximate of said trunnion ring, said base plate being spaced outwardly from a vertical plane through said central longitudinal axis a distance less than the radius of said cylindrical drum;

a roller member with a longitudinal axis of rotation substantially parallel with said central longitudinal axis of said drum mounted on said base plate with bearings to permit said roller member engages said trunnion ring; and first and second support bearings connected to said base plate to contact said cradle frame, said first and second support bearings being in alignment on said base plate substantially transverse to the longitudinal axis of rotation of said roller member mounted on said base plate, said first and second support bearings adapted to permit slight arcuate movement of said base plate about said first support bearing and to permit slight tilting movement of said base plate about a common transverse axis through said first and second support bearings;

said second support bearing comprising a strut and first and second mated ball and socket components connected to each end of said strut wherein each ball component is rotatably received within the corresponding socket component to permit slight arcuate movement of said base plate about said first support bearing and to permit slight tilting movement of said base plate about a common transverse axis through said first and second support bearings;

whereby said arcuate and tilting movements of said base plate permit the roller member mounted thereon to maintain full contact with said trunnion ring.

* * * * *